United States Patent
Hosein

(10) Patent No.: US 8,325,654 B2
(45) Date of Patent: Dec. 4, 2012

(54) INTEGRATED SCHEDULING AND POWER CONTROL FOR THE UPLINK OF AN OFDMA NETWORK

(75) Inventor: Patrick Hosein, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1370 days.

(21) Appl. No.: 11/940,134

(22) Filed: Nov. 14, 2007

(65) Prior Publication Data
US 2008/0159215 A1    Jul. 3, 2008

Related U.S. Application Data

(60) Provisional application No. 60/882,265, filed on Dec. 28, 2006.

(51) Int. Cl.
*H04W 4/00* (2009.01)
(52) U.S. Cl. ......... 370/329; 370/328; 370/310; 370/330
(58) Field of Classification Search .................. 370/318, 370/329, 331, 252; 455/432, 436, 444, 446, 455/517, 522, 524, 525
See application file for complete search history.

(56) References Cited

U.S. PATENT DOCUMENTS

| | | | |
|---|---|---|---|
| 5,844,983 A | 12/1998 | Lilja | |
| 6,085,107 A | 7/2000 | Persson et al. | |
| 6,580,920 B2 | 6/2003 | Kalliojärvi | |
| 6,591,110 B1 | 7/2003 | Kim et al. | |
| 6,603,985 B1 | 8/2003 | Ichihashi | |
| 6,628,956 B2 | 9/2003 | Bark et al. | |
| 6,735,420 B2 | 5/2004 | Baldwin | |
| 6,760,567 B1 | 7/2004 | Jeong et al. | |
| 6,882,860 B1 | 4/2005 | Kim | |
| 7,089,041 B2 | 8/2006 | Huang | |
| 7,099,384 B1 * | 8/2006 | Jalali et al. | 375/229 |
| 7,162,267 B2 | 1/2007 | Kim | |
| 7,218,948 B2 | 5/2007 | Laroia et al. | |
| 7,313,124 B2 | 12/2007 | Lim et al. | |
| 7,333,604 B2 | 2/2008 | Zernovizky et al. | |
| 7,519,036 B2 | 4/2009 | Zhang | |
| 7,529,550 B2 | 5/2009 | Li | |
| 7,676,198 B2 | 3/2010 | Mahany | |

(Continued)

FOREIGN PATENT DOCUMENTS

CN    1829131    9/2006

OTHER PUBLICATIONS

Hosein, P., "Interference Management of OFDMA Uplinks," IEEE 65th Vehicular Technology Conference, Apr. 22-25, 2007, pp. 2435-2439, IEEE.

(Continued)

*Primary Examiner* — Hassan Phillips
*Assistant Examiner* — Anez Ebrahim
(74) *Attorney, Agent, or Firm* — Slater & Matsil, L.L.P.

(57) ABSTRACT

Managing radio resources and power for OFDMA uplinks is disclosed in which a threshold transmission rate for the reverse link is used by base stations to compare against the achievable reverse link transmission rate of a particular AT within the sector serviced by the base station. When the calculated rate is higher than the threshold rate, the base station allocates maximum power to the AT. Otherwise, when the calculated rate is lower than the threshold rate, zero power is allocated to the AT.

19 Claims, 7 Drawing Sheets

U.S. PATENT DOCUMENTS

| | | | |
|---|---|---|---|
| 7,689,203 | B2 | 3/2010 | Zhang et al. |
| 7,689,240 | B2 | 3/2010 | Anderson |
| 7,701,911 | B2 | 4/2010 | Soliman |
| 7,702,342 | B2 | 4/2010 | Duan |
| 7,706,389 | B2 | 4/2010 | Liu |
| 7,738,907 | B2 | 6/2010 | Xiao et al. |
| 7,742,444 | B2 | 6/2010 | Mese et al. |
| 7,752,128 | B2 | 7/2010 | Shan |
| 2002/0077138 | A1 | 6/2002 | Bark et al. |
| 2002/0082017 | A1* | 6/2002 | Hattori ............ 455/436 |
| 2002/0159422 | A1* | 10/2002 | Li et al. ............ 370/342 |
| 2002/0172186 | A1 | 11/2002 | Larsson |
| 2003/0017837 | A1 | 1/2003 | Kalliojarvi |
| 2003/0114127 | A1 | 6/2003 | Baldwin |
| 2004/0062192 | A1* | 4/2004 | Liu et al. ............ 370/208 |
| 2004/0102205 | A1* | 5/2004 | Zhang et al. ............ 455/522 |
| 2004/0127223 | A1 | 7/2004 | Li et al. |
| 2004/0166886 | A1 | 8/2004 | Laroia et al. |
| 2004/0166887 | A1 | 8/2004 | Laroia et al. |
| 2005/0135324 | A1 | 6/2005 | Kim et al. |
| 2005/0186933 | A1 | 8/2005 | Trans |
| 2005/0272440 | A1 | 12/2005 | Li |
| 2006/0018276 | A1* | 1/2006 | Kim et al. ............ 370/329 |
| 2006/0083161 | A1 | 4/2006 | Laroia et al. |
| 2006/0089154 | A1 | 4/2006 | Laroia et al. |
| 2006/0092881 | A1 | 5/2006 | Laroia et al. |
| 2006/0094363 | A1 | 5/2006 | Kang et al. |
| 2006/0109826 | A1 | 5/2006 | Zhang |
| 2006/0183495 | A1 | 8/2006 | Soliman |
| 2006/0209721 | A1 | 9/2006 | Mese et al. |
| 2006/0286995 | A1 | 12/2006 | Onggosanusi et al. |
| 2007/0018786 | A1 | 1/2007 | Shan |
| 2007/0070908 | A1 | 3/2007 | Ghosh et al. |
| 2007/0104164 | A1 | 5/2007 | Laroia et al. |
| 2007/0111746 | A1 | 5/2007 | Anderson |
| 2007/0115800 | A1 | 5/2007 | Fonseka et al. |
| 2007/0115861 | A1 | 5/2007 | Zhang et al. |
| 2007/0116139 | A1 | 5/2007 | Subramanian et al. |
| 2007/0123213 | A1 | 5/2007 | Wu |
| 2007/0149129 | A1 | 6/2007 | Das et al. |
| 2007/0178906 | A1 | 8/2007 | Gao et al. |
| 2007/0189215 | A1 | 8/2007 | Wu et al. |
| 2007/0195755 | A1 | 8/2007 | Li et al. |
| 2007/0213087 | A1 | 9/2007 | Laroia et al. |
| 2007/0225029 | A1 | 9/2007 | Abusch-Magder |
| 2007/0243876 | A1 | 10/2007 | Duan |
| 2007/0287454 | A1 | 12/2007 | Zhu et al. |
| 2007/0293260 | A1 | 12/2007 | Xiao et al. |
| 2008/0032732 | A1 | 2/2008 | Hosein |
| 2008/0039104 | A1 | 2/2008 | Gu et al. |
| 2008/0049705 | A1 | 2/2008 | Huang et al. |
| 2008/0070498 | A1 | 3/2008 | Tan et al. |
| 2008/0076466 | A1 | 3/2008 | Larsson |
| 2008/0102844 | A1 | 5/2008 | Zhu et al. |
| 2008/0112383 | A1 | 5/2008 | Li |
| 2008/0112395 | A1 | 5/2008 | Zhu et al. |
| 2008/0112407 | A1 | 5/2008 | Liu |
| 2008/0175186 | A1 | 7/2008 | Liu et al. |
| 2008/0219183 | A1 | 9/2008 | Yin |
| 2008/0242339 | A1 | 10/2008 | Anderson |
| 2008/0248817 | A1 | 10/2008 | Gao et al. |
| 2008/0274739 | A1 | 11/2008 | Wu |
| 2009/0052327 | A1 | 2/2009 | Larsson et al. |
| 2009/0158442 | A1 | 6/2009 | Zhang |
| 2009/0170548 | A1 | 7/2009 | Soliman |
| 2009/0311968 | A1 | 12/2009 | Wigren |

OTHER PUBLICATIONS

Hosein, P, "Radio Resource Management for OFDMA Uplinks," Sarnoff Symposium, Apr. 30, 2007-May 2, 2007, 5 pages, IEEE.

Hosein, P., "On Uplink Interference Management for OFDMA Networks," 18$^{th}$ Annual IEEE International Symposium on Personal, Indoor and Mobile Radio Communications, Sep. 3-7, 2007, 5 pages, IEEE.

"Overview for Ultra Mobile Broadband (UMB) Air Interface Specification," 3rd Generation Partnership Project 2, 3GPP2 C.S0084-000-0, Version 2.0, Aug. 2007, pp. i-5-2, 3GGP2.

PCT International Search Report and PCT Written Opinion of the Internaltional Searching Authority for PCT/CN2007/071351, forms PCT/ISA/220 and PCT/ISA/237, mailed Apr. 10, 2008, Applicant: Huawei Technologies Co., Ltd., et al., 10 pages.

Ghosh, Arunabha, et al., "Broadband Wireless Access With WiMax/ 802.16: Current Performance Benchmarks and Future Potential," IEEE Communications Magazine, pp. 120-136, Feb. 2005.

Hosein, Patrick, "On the Optimal Scheduling of Uplink Resources in OFDMA-Based Wireless Networks," Proceedings of the 12$^{th}$ European Wireless Conference, 5 pages, Apr. 2006.

Kumaran, Krishnan, et al., "Uplink scheduling in CDMA Packet-Data Systems," IEEE INFOCOM, 9 pages, 2003.

Oh, Seong Jun, et al., "QoS-Constrained Information—Theoretic Sum Capacity of Reverse Link CDMA Systems," IEEE Transactions on Wireless Communications, vol. 5, No. 1, pp. 3-7, Jan. 2006.

Third Generation Partnership Project 2, "Joint Proposal for 3GPP2 Physical Layer for FDD Spectra," Contribution C30-20060731-040R4, 84 pages, Jul. 31, 2006.

* cited by examiner

SECTOR (2,3)

SECTOR (3,3)

SECTOR (2,2)

SECTOR (3,2)

INTEGRATED SCHEDULING AND POWER CONTROL FOR THE UPLINK OF AN OFDMA NETWORK

This application claims the benefit of U.S. Provisional Application No. 60/882,265, filed on Dec. 28, 2006, entitled, "Method and System for Integrated Scheduling and Power Control for the Uplink of an OFDMA Network," and is related to U.S. patent application Ser. No. 11/773,395, filed on Jul. 3, 2007, entitled, "Method and System for Optimal Allocation of Uplink Transmission Power in Communication Networks," which applications are hereby incorporated herein by reference.

TECHNICAL FIELD

The present invention relates, in general, to orthogonal frequency division multiple access (OFDMA) networks, and, more particularly, to integration of scheduling and power control for the uplink of OFDMA networks.

BACKGROUND

The next generation of wireless networks, such as fourth generation (4G) networks, will likely use OFDMA (Orthogonal Frequency Division Multiple Access) in the reverse link or uplink from the mobile device to the base station. In OFDMA, the reverse link resources assigned to a user are called tiles. Each tile generally consists of a subset of subcarriers, which may either be consecutive or spread out over an entire bandwidth. Because OFDMA sectors assign, at most, one user to each of tile, reverse link transmissions within any given sector are typically orthogonal. However, these reverse link transmissions may be affected by intercell interference. This interference typically results from users in adjacent sectors that may have also been assigned to the same tile. If those users in the adjacent sectors transmit using high power then the intercell interference may severely limit the signal-to-interference-plus-noise ratio (SINR) achieved by the user. Therefore, user transmission powers are typically managed carefully, in order to avoid excessive intercell interference.

In the reverse link of an OFDMA network, the transmission power of access terminals (ATs) is generally selected large enough to provide the desired transmission rate but not too high to significantly degrade transmissions in neighboring sectors because of the intercell interference caused to those transmissions. For example, there is a specific user (referred to as the "concerned user") in a specific sector (referred to as the "concerned sector") transmitting over a specific tile. The paradox of intercell interference occurs along the following sequence of events:

The transmission power of the concerned user is increased since a higher rate is needed;
The interference on adjacent sectors increases;
Users in adjacent sectors increase their power to counteract the increased interference and maintain their rates;
The increased power of users in the adjacent sectors results in an increase in the interference in the concerned sector; and
The concerned user must increase power again to counteract this increased interference in order to maintain the higher rate.

The above sequence of events may repeat until the concerned user reaches its maximum transmission power. Because the concerned user reaches its maximum power, maximum interference on neighboring sectors may also be achieved, which then causes neighboring users to reach their maximum transmission power; thus, maximizing interference in the system.

Solutions have been addressed for down or forward link transmissions in code division multiple access (CDMA) networks. However, the OFDMA case has some significant differences to the CDMA, (a) there is no intracell interference (interference between subcarriers is negligible); (b) soft combining is not possible (because each sector independently schedules its reverse link users) and, therefore, there are no macrodiversity gains; and (c) the power spectral density for an AT transmission can be high if few tiles are allocated to it (and, thus, the intercell interference it causes may significantly degrade transmissions in adjacent sectors).

Each of the current solutions suggested to solve the intercell interference problem in downlink transmissions uses global knowledge of the entire system. It would be logical to assume that these downlink solutions could also be analogized to solve the uplink problem as well. However, such algorithms use global knowledge, which means that either all information is collected at some central entity that computes the solution and informs each sector of this solution or global information is collected by each sector which then determines the optimal solution. Regardless of which method is used to manage global, system-wide information, there would need to be a significant amount of information exchanged across the entire network. Furthermore, the delay in collecting this information may mean that the computed solution is no longer optimal for a constantly changing communication environment.

SUMMARY OF THE INVENTION

These and other problems are generally solved or circumvented, and technical advantages are generally achieved, by representative embodiments directed to managing radio resources and power for OFDMA uplinks. A threshold transmission rate for the reverse link is used by base stations to compare against the achievable reverse link transmission rate of a particular AT within the sector serviced by the base station. When the calculated rate is higher than the threshold rate, the base station allocates maximum power to the AT. Otherwise, when the calculated rate is lower than the threshold rate, zero power is allocated to the AT.

In accordance with a preferred embodiment of the present invention, a method for managing radio resources in an OFDMA network includes periodically determining an optimal power allocation for an AT within each sector of a plurality of sectors and changing the optimal power allocation when doing so would increase the total reverse link transmission rate of that sector. The start time of the determination for the each sector is independent. Therefore, each sector can begin determining when it needs to. However, the period of the determination is the same. Thus, each sector will complete the determination at least once during a single period.

In accordance with a preferred embodiment of the present invention, a method for managing radio resources in a sector of an OFDMA network includes calculating a reverse link transmission rate for an AT in the sector, comparing the calculated reverse link transmission rate to a threshold transmission rate, where the threshold transmission rate is predetermined, and setting an optimal power allocation for the AT to maximum power when the calculated reverse link transmission rate is greater than the threshold transmission rate.

In accordance with a preferred embodiment of the present invention, a base station for an OFDMA network is made up from a processor, memory, accessible by the processor, and a power control module stored in the memory and executable by the processor. The power control module includes a transmission rate calculator configured to calculate a reverse link transmission rate for an AT in a sector served by the base station, a rate comparator configured to compare the calculated reverse link transmission rate to a threshold transmission rate, where the threshold transmission rate is predetermined for the OFDMA network, and a power allocation component configured to allocate power to the AT based on results from the rate comparator.

In accordance with a preferred embodiment of the present invention, a computer program product having a computer readable medium with computer program logic recorded thereon includes code for calculating a reverse link transmission rate for an AT in a sector of an OFDMA network, code for comparing the calculated reverse link transmission rate to a threshold transmission rate, where the threshold transmission rate is predetermined and code for setting an optimal power allocation for the AT to maximum power when the calculated reverse link transmission rate is greater than the threshold transmission rate.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

On a periodic basis, each sector determines the optimal power allocation for the mobile device or AT in its sector, given the prevailing power allocations of all other sectors. The time at which each sector performs this computation is independent of all other sectors, but the period between computations is the same for all sectors so that within this period all sectors perform the computation exactly once.

This process converges after a finite number of iterations. Let n denote the index of the most recent computation iteration. Let $\bar{p}(n) \in \{0, p_{max}\}^N$ denote the corresponding power allocation vector. Considering the decision process for any given AT, i, if $p_i(n)=0$ then, for the next computation iteration, $p_i(n+1)=p_{max}$ when doing so strictly increases the total reverse link transmission rate of the network. Similarly, if $p_i(n)=p_{max}$ then, for the next computation iteration, $p_i(n+1)=0$ when doing so strictly increases the total reverse link rate of the network. Therefore, either the sector makes no change or the change results in a strict increase in the total reverse link rate of the network.

If no changes are made to any sector assignments in an iteration, then the algorithm has converged, since no changes will be made from then onwards. Each time a change is made, the system-wide reverse link throughput rate strictly increases. This implies that a power allocation vector will never be repeated. Because there are a finite number of power allocation combinations, this means that the power allocation vector converges after a finite number of iterations.

Figure 1:
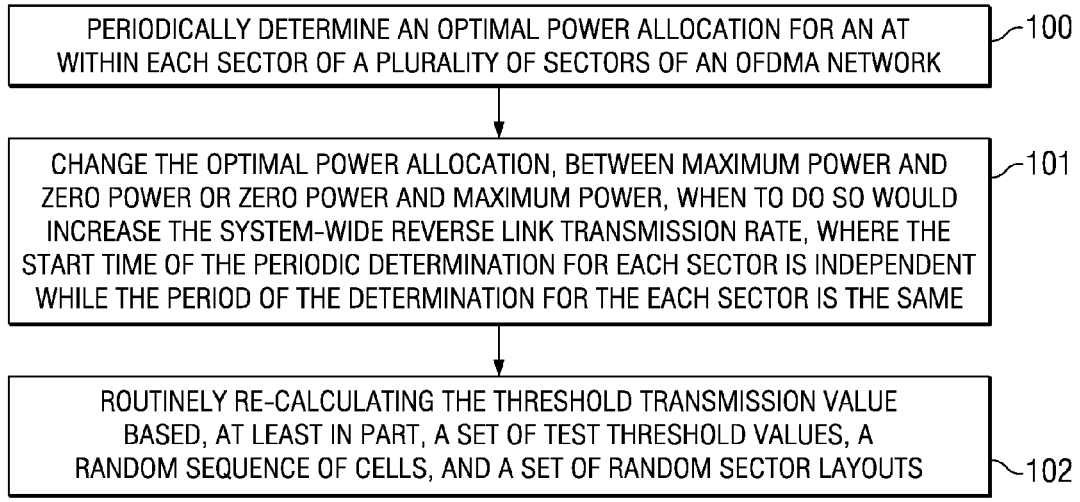
FIG. 1 is a flowchart illustrating example steps executed to implement an OFDMA network configured according to one embodiment of the present invention.

FIG. 1 is a flowchart illustrating example steps executed to implement an OFDMA network configured according to one embodiment of the present invention. In step 100, an optimal power allocation is periodically determined for an AT within each sector of a plurality of sectors of an OFDMA network. The optimal power allocation for the AT is changed, between maximum power and zero power or zero power and maximum power, in step 101, when to do so would increase a total reverse link transmission rate of the OFDMA network, where the start time of the periodic determination for each sector is independent while the period of the determination for the each sector is the same. In step 102, the threshold transmission value is routinely re-calculated based, at least in part, a set of test threshold values, a random sequence of cells, and a set of random sector layouts.

It should be noted that the process described in FIG. 1 describes the power management system across the multiple sectors of the entire OFDMA network. Each sector within the network, thus, determines the power allocation once within the common period.

Next, the decision process is considered for each sector. For purposes of this example, consider the case for which $p_i(n)=0$. It should be noted that the process described herein for $p_i(n)=0$ would be similar for $p_i(n)=p_{max}$. Thus, the following description also applies in the $p_{max}$ case, except with $p_i(n)=p_{max}$.

When determine how to allocate power, the $p_i(n)=0$ allocation should be changed if doing so results in a strict increase in the total reverse link transmission rate. If power is increased to $p_{max}$, the change in total, system-wide reverse link transmission rate is given by:

$$\Delta i = \log\left(1 + \frac{p_{max} g_{ii}}{X_i + N_i}\right) + \sum_{j \neq i} \log\left(1 + \frac{x_j}{X_j + p_{max} g_{ij} + N_j}\right) - \sum_{j \neq i} \log\left(1 + \frac{x_j}{X_j + N_j}\right) \quad (1)$$

Based on formula (1), a relationship can be seen between $\Delta_i$ and $g_{ii}$. The first term of formula (1) increases as $g_{ii}$ increases. The second term, while not directly related to $g_{ii}$, will also change when $g_{ii}$ changes. On average, the value of $g_{ij}$ will decrease as $g_{ii}$ increases (although one can design rare cases where this is not necessarily true). If the average holds true for the system design, then the second term will also increase as $g_{ii}$ increases. In this example, the third term is independent of $g_{ii}$ because $p_i(n)=0$ and, thus, user i does not contribute to the interference $X_j$ for any neighboring sector, j. A conclusion may, therefore, be made that $\Delta_i$ increases as $g_{ii}$ also increases. Moreover, let $r_i$ denote the potential reverse link transmission rate that user i can achieve if allowed to transmit. It can be noted that $r_i$ also increases as $g_{ii}$ increases. This means that $\Delta_i$ will also increase monotonically with $r_i$.

Figure 2:
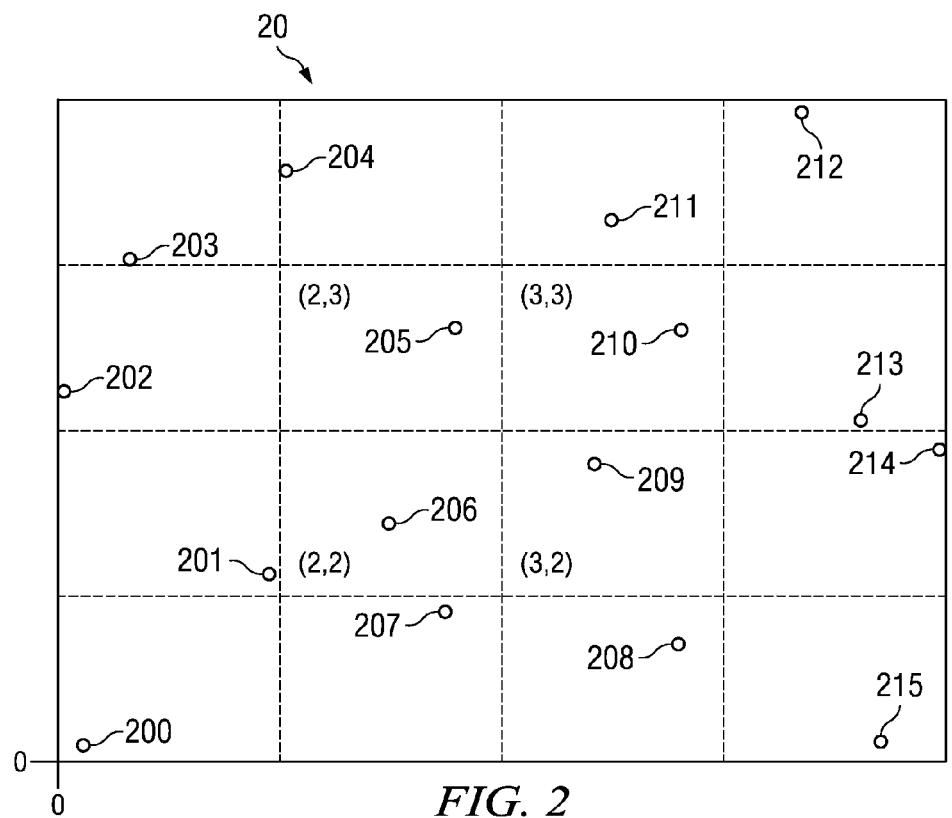
FIG. 2 is a diagram illustrating a portion of an OFDMA network configured according to one embodiment of the present invention.

FIG. 2 is a diagram illustrating a portion of OFDMA network 20 configured according to one embodiment of the present invention. The portion of OFDMA network 20 illustrated includes 16 square cells laid out in a grid, in which each cell has an antenna lying at its center (not shown). Each cell contains a single AT, ATs 200-215. Each of ATs 200-215 desire to have reverse link communication with their respective base stations (not shown). The assumption is made that the signal strength attenuates with the distance taken to the power of 3.5 according to the Hata propagation model. Each of ATs 200-215 is randomly placed within each cell.

For each of the four central cells, sectors (2,2), (2,3), (3,3), and (3,2), the location of one AT is randomly changed in the chosen cell while the ATs in the other 15 cells remain fixed. For each of these four cases, the corresponding values of $\Delta_i$ and the achievable user rate r are computed. FIG. 7 illustrates the plots, for each of the four central cells, of the function $\Delta_i$ versus $r_i$. Note that $\Delta_i$ increases monotonically with the achievable rate. Furthermore, although the zero crossing point is different in each case, they all are approximately equal.

Therefore, based on this correlation, an assumption is made, in general, that a threshold, $t_i$, exists for each sector i, such that, if $r_i > t_i$, it is optimal to allocate maximum power to the AT, otherwise, the AT should be allocated zero power and not transmit. This threshold (which may change over time) can be computed by setting $\Delta_i=0$ in equation (1) and solving for $g_{ii}$. The resulting threshold, $t_i$, is then the achievable rate corresponding to this value of $g_{ii}$. In operation, however, even if all of the information used to calculate $t_i$ was available, the determination of the gain, $g_{ii}$, when $\Delta_i=0$ is difficult to compute.

One solution around this computational complexity lies in the characteristics of the system. In homogeneous systems, where all sectors have identical characteristics, the time average of $t_i$ converges to some value, $\bar{t}$, which is the same for all sectors. Therefore, $t_i$ may be approximated by some constant, $\bar{t}$, for all sectors. By accepting the assumption of using the time-averaged approximation, $\bar{t}$, each sector can independently determine the power allocation of its user by determining if the achievable rate is above or below $\bar{t}$. The resulting algorithm provides a sub-optimal, but acceptable, solution because (a) we obtain a local optimum since each user independently solves for the power allocation of its user and (b) a single threshold is used for all sectors and for all time.

In various embodiments of the present invention, $\bar{t}$ may be estimated through a series of calculations and analyses. The resulting estimation, $\hat{t}$, is then applied as the transmission rate threshold. For any given scenario of the various embodiments, the threshold is varied and used to calculate a set of threshold rates. The particular threshold value that provides the maximum total transmission rate will then be determined.

It should be noted that as the threshold approaches zero, at some point all ATs or mobile devices are allowed to transmit with full power. These threshold values provide a certain degree of fairness (i.e., equal transmit power fairness). In contrast, as the threshold values are increased, fewer ATs are allowed to transmit. Eventually, the threshold value reaches a level where only a single AT is allowed to transmit on the reverse link of the specific tile. This AT will be the one with the highest channel gain (i.e., the best radio conditions).

In order to demonstrate the variation of the total rate, $\Delta_t$, with the threshold, $\hat{t}$, the layout in FIG. 2 is considered again. For this layout the (normalized) optimal total rate, $\Delta_t$, is 31.38. Using a random sequence of cells, the potential user rate, r, is calculated in the first sector of the sequence. The system then determines whether r is larger than the threshold $\hat{t}$. If the present power allocation of the AT is zero, and $r > \hat{t}$, then the power allocation is changed to $p_{max}$. Similarly, if $r < \hat{t}$ and the present power allocation of the AT is $p_{max}$, then the AT power allocation is changed to zero power. All of the sectors are then re-evaluated based on the new power allocation and the sequence repeats. When the power allocation converges (i.e., there are no more power allocation changes), the resulting total transmission rate is determined. The entire process is then repeated for various threshold values.

Figure 8:
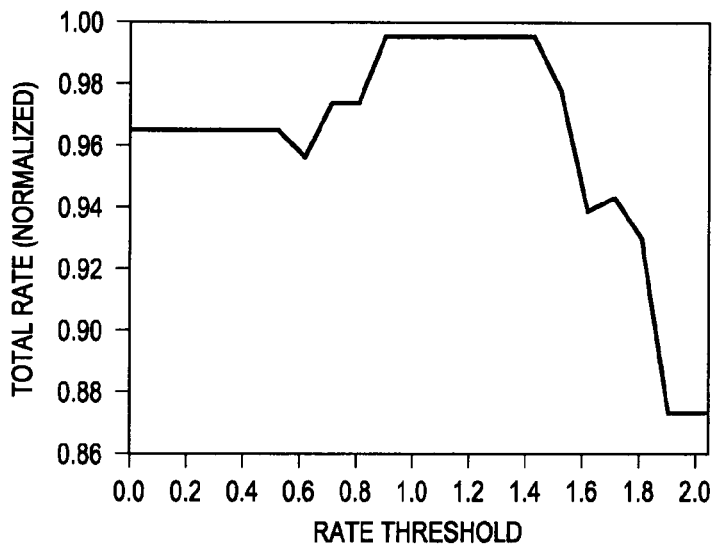
FIG. 8 illustrates the total reverse link transmission rate, normalized by the optimal total transmission rate, plotted against the threshold value, $\hat{t}$.

In FIG. 8, the total reverse link transmission rate, normalized by the optimal total transmission rate, is plotted against the threshold value, $\hat{t}$. It can be seen from the results in FIG. 8 that there is, in fact, an optimal value for threshold, $\hat{t}$. Furthermore the resulting solution using this estimation procedure is attained over a wide range of threshold values, many solutions obtaining a level within 1% of the optimal value.

Using a value of $\hat{t}=1$, which is one of the thresholds that achieves the largest total rate (FIG. 8), the power allocation vector can be determined in each iteration. Initially, the power allocation is set to zero for all users. Starting from the power allocation at the end of the first iteration (i.e., each sector performs one power allocation decision) the sequence of power allocations is given as follows in Table 1:

TABLE 1

| 1 1 1 1 | → | 0 1 1 1 | → | 0 1 1 1 |
| 0 1 1 1 |   | 1 1 1 1 |   | 1 1 1 1 |
| 1 1 1 1 |   | 1 1 1 0 |   | 0 1 1 0 |
| 1 1 1 1 |   | 1 1 1 1 |   | 1 1 1 1 |
| R = 30.05 | | R = 30.60 | | R = 31.26 |

Each array element is set to '1' if the AT in the corresponding sector is allowed to transmit with maximum power, otherwise, it is set to zero. Below each array in Tables 1 and 2 are the corresponding total rates. For this particular example, the optimal allocation is given in Table 2 by:

TABLE 2

0 1 1 1
1 1 1 1
0 1 1 0
1 0 1 1
R = 31.38

Using this distributed algorithm, therefore, provides a solution that is optimal for all but one sector.

Figure 9A:
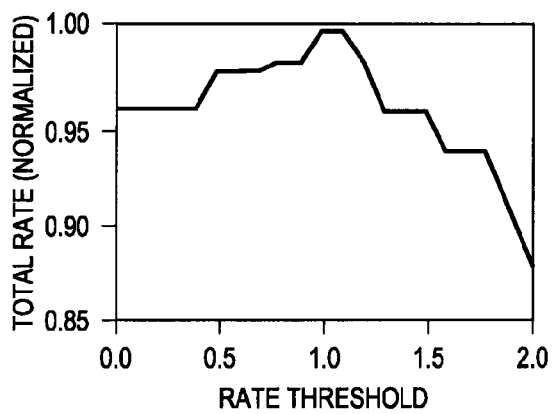
FIGS. 9(a)-9(d) illustrates normalized total transmission rale versus rate threshold.
Figure 9B:
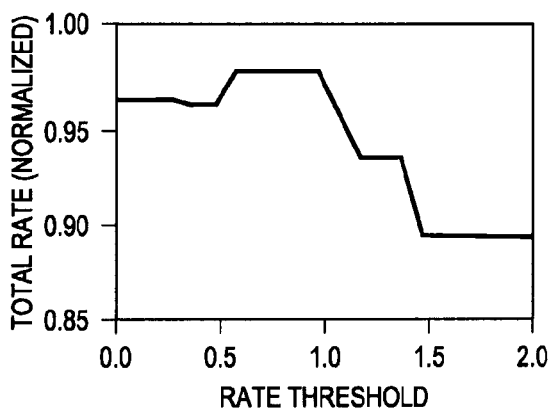
Figure 9C:
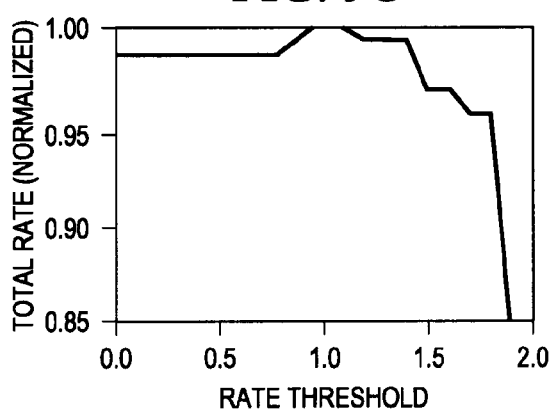
Figure 9D:
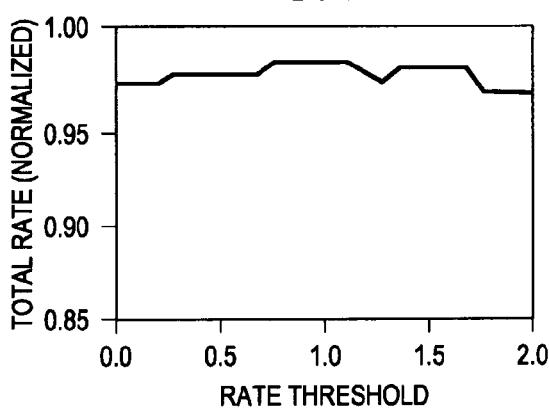

Next, this determination process is repeated to calculate the total, system-wide transmission rate, normalized by the optimal total rate, against the transmission rate threshold for different random layouts and with different maximum transmission powers. These additional iterations are used to determine the sensitivity of the threshold to the particular layout. In FIGS. 9(a) and (b), the results are plotted for two different layouts. FIG. 9(c) illustrates a plot in which the maximum transmission power is decreased by a factor of two, while FIG. 9(d) illustrates a plot in which the maximum transmission power is increased by a factor of two. In all such cases, the optimal threshold region includes the value '1'. These results support an assumption that the threshold value, $\hat{t}$, is robust for variations in the layout of ATs and the maximum transmission power. Thus, once chosen, it should not need to be adjusted very often.

Figure 3:
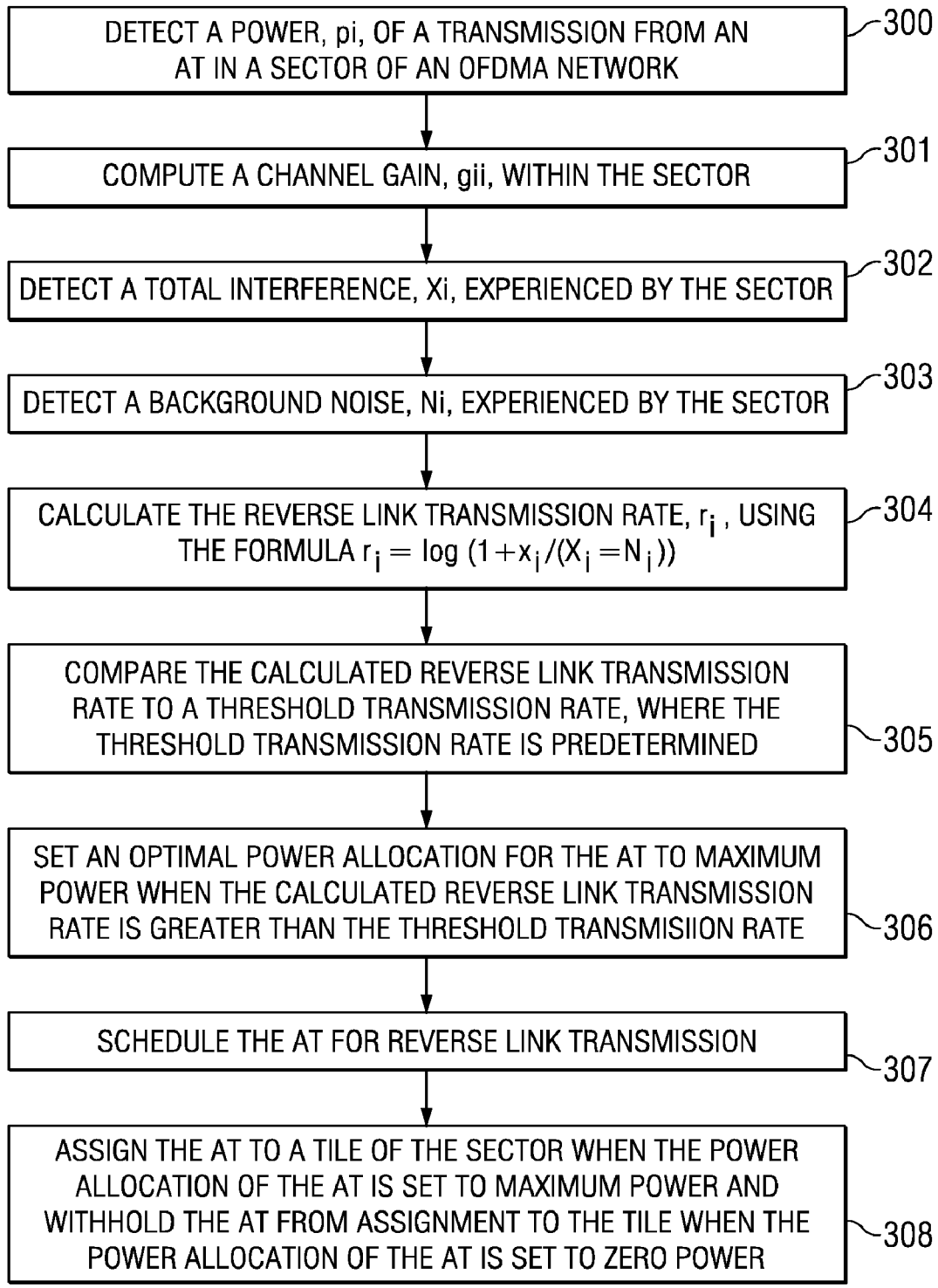
FIG. 3 is a flowchart illustrating example steps executed to implement one embodiment of the present invention.

FIG. 3 is a flowchart illustrating example steps executed to implement one embodiment of the present invention. In step 300, the power, $p_i$, of a transmission is detected from an AT in a sector of an OFDMA network. The channel gain, $g_{ii}$, is computed, in step 301, within the sector. The total interference, $X_i$, is detected, in step 302, as experienced by the sector. The background noise, $N_i$, experienced by the sector is detected in step 303. The reverse link transmission rate, $r_i$, is calculated, in step 304, using the formula:

$$r_i = \log\left(1 + \frac{x_i}{X_i + N_i}\right).$$

The calculated reverse link transmission rate is compared to a threshold transmission rate, in step 305, where the threshold transmission rate is predetermined. An optimal power allocation for the AT is set to maximum power, in step 306, when the calculated reverse link transmission rate is greater than the threshold transmission rate. The AT is then scheduled for reverse link transmission in step 307. In step 308, the AT is assigned to a tile of the sector when the power allocation of the AT is set to maximum power and withheld from assignment to the tile when the power allocation of the AT is set to zero power.

Figure 4A:
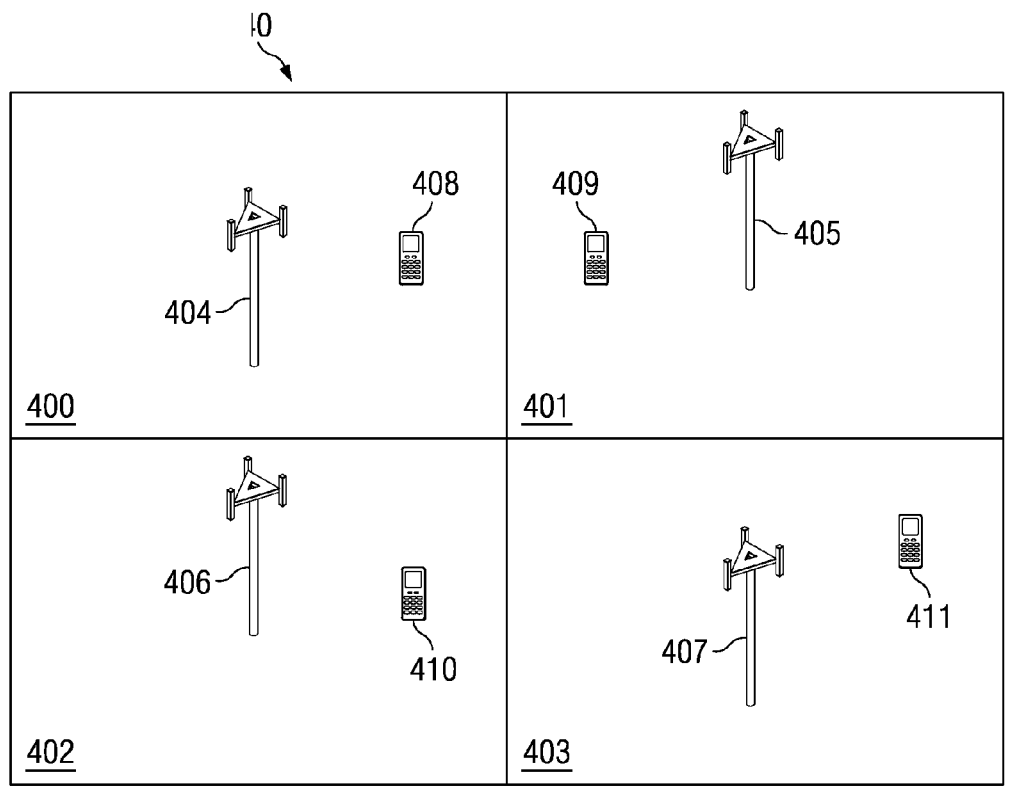
FIGS. 4A-4C are diagrams illustrating an OFDMA network configured according to one embodiment of the present invention.

FIG. 4A is a diagram illustrating OFDMA network 40 configured according to one embodiment of the present invention. Each of sectors 400-403 of OFDMA network 40 includes base stations 404-407. Mobile stations 408-411 are each within sectors 400-403, respectively, and request reverse link transmission to base stations 404-407, respectively. According to one embodiment of the present invention, base station 405 determines the achievable reverse link transmission rate for mobile station 409, compares it to the predetermined threshold transmission rate, and finds it to be greater than the threshold. Base station 405 sets the power allocation of mobile station 409, schedules its transmission and assigns mobile station 409 to the appropriate tile. In the same manner, base station 404 determines that the achievable rate for mobile station 408 is less than the threshold rate and sets the power allocation of mobile station 408 to zero power.

Figure 4B:
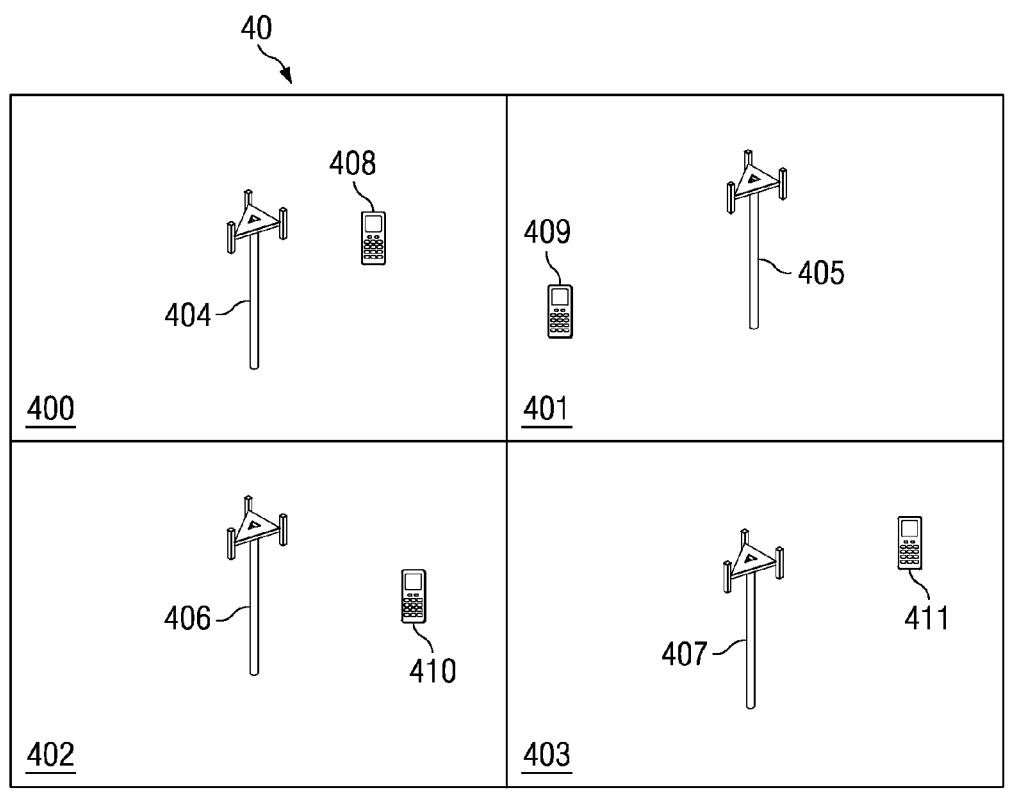

FIG. 4B is a diagram illustrating OFDMA network 40 configured according to one embodiment of the present invention. In FIG. 4B, both mobile stations 408 and 409 have moved within sectors 400 and 401, respectively. On re-calculating the achievable transmission rate for mobile station 408, base station 404 now finds it greater than the threshold rate and sets the power allocation of mobile station 408 to maximum power. Similarly, base station 405 now finds that the achievable transmission rate for mobile station 409 is less than the threshold rate and, thereafter, sets the power allocation of mobile station 409 to zero power. Because the power allocation of mobile station 409 is now zero power, it does not contribute to any interference in neighboring sectors 400, 402, and 403. Similarly, in FIG. 4A, when mobile station 408 had zero power allocation, it did not contribute to any interference in neighboring sectors 401-403.

Figure 4C:
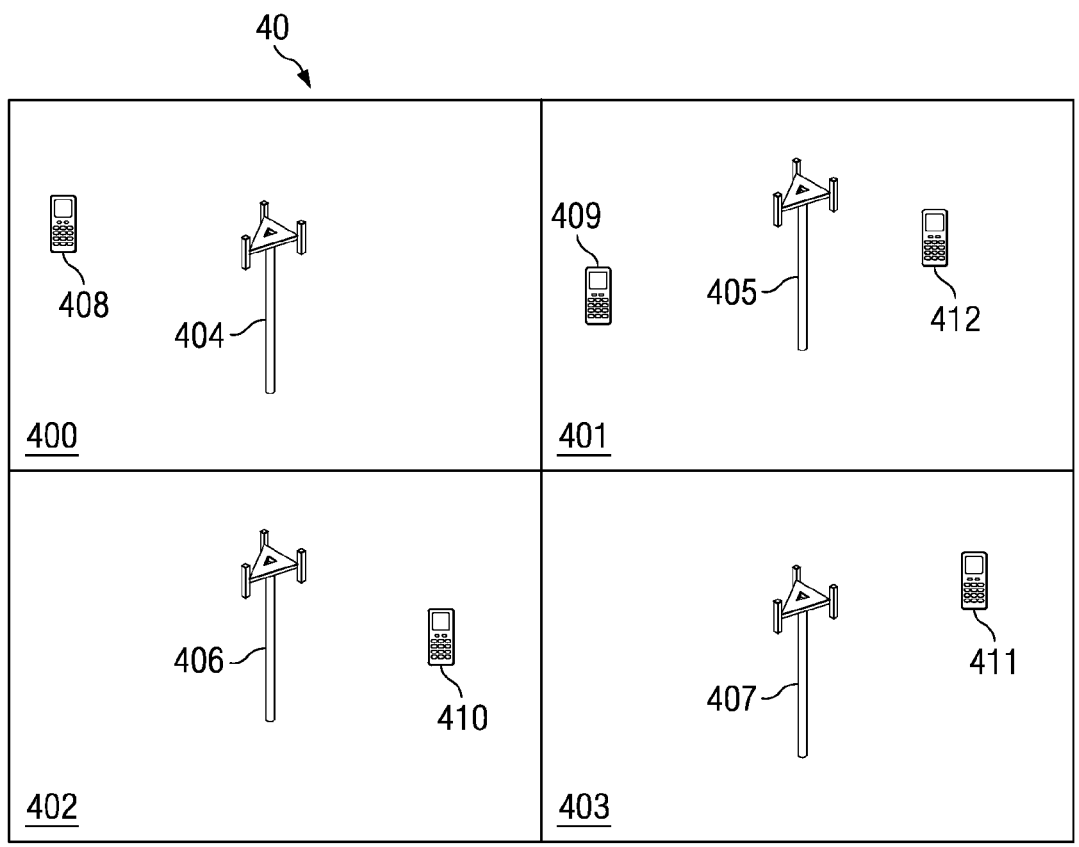

FIG. 4C is a diagram illustrating OFDMA network 40 configured according to one embodiment of the present invention. In FIG. 4C, mobile stations 408 and 409 have moved, and a new AT, mobile station 412, has traveled into sector 401. After receiving uplink transmission requests from both mobile stations 409 and 412, base station 405 determines to calculate the achievable rate with respect to mobile station 412, because it detects mobile station 412 to have a better signal, based on its proximity to base station 405. Comparing the achievable rate of mobile station 412 to the threshold transmission rate, base station 405 sets the power allocation to maximum power for mobile station 412, as its achievable rate calculates out to be higher than the threshold rate.

It should be noted that the specific embodiments and layout of the sectors illustrated in FIGS. 4A-4C are merely examples. Various additional and/or alternative embodiments of the present invention may be applied to numerous other layouts and systems.

Figure 5:
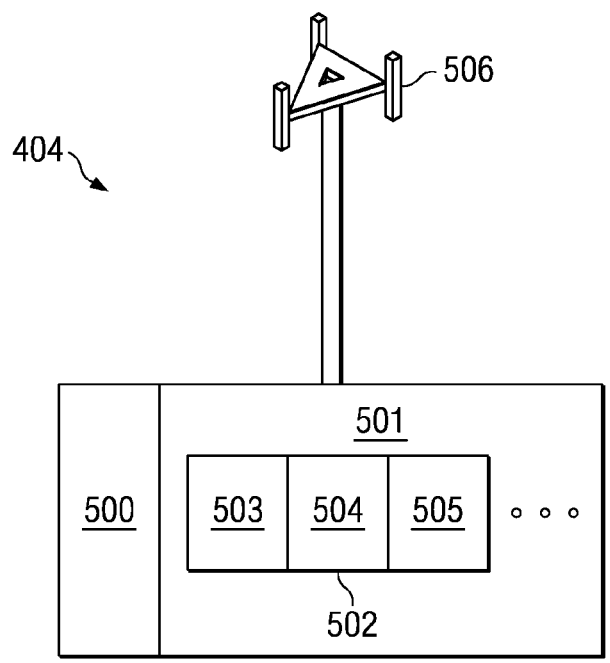
FIG. 5 is a block diagram illustrating a base station configured according to one embodiment of the present invention.

FIG. 5 is a block diagram illustrating base station 404 configured according to one embodiment of the present invention. Base station 404 comprises processor 500, memory 501, and antenna array 506. Power control module 502 is stored in memory 501 and controls how base station 404 allocates power according to one embodiment of the present invention. Processor 500 accesses memory 501 to run power control module 502. In operation, power control module 502 includes transmission rate calculator 503, which calculates the reverse link transmission rate for an AT or mobile station within the serviced sector. Transmission rate calculator 503 uses data measured and detected by base station 404 through antenna array 506 in order to perform its calculations.

Power control module 502 also includes rate comparator 504, which compares the reverse link transmission rate, calculated by transmission rate calculator 503, to the predetermined threshold transmission rate. When rate comparator 504 detects that the calculated reverse link transmission rate is greater than the threshold rate, it signals power allocation component 505 to set the power allocation of the subject AT to the maximum power. In contrast, when rate comparator 504 detects that the reverse link transmission rate is less than the threshold rate, it signals power allocation component 505 to set the subject AT's power allocation to zero power. Thus, base station 404 is able to efficiently manage network power using data from its own serviced sector.

The various illustrative logical blocks, modules, and circuits described in connection with the embodiment disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
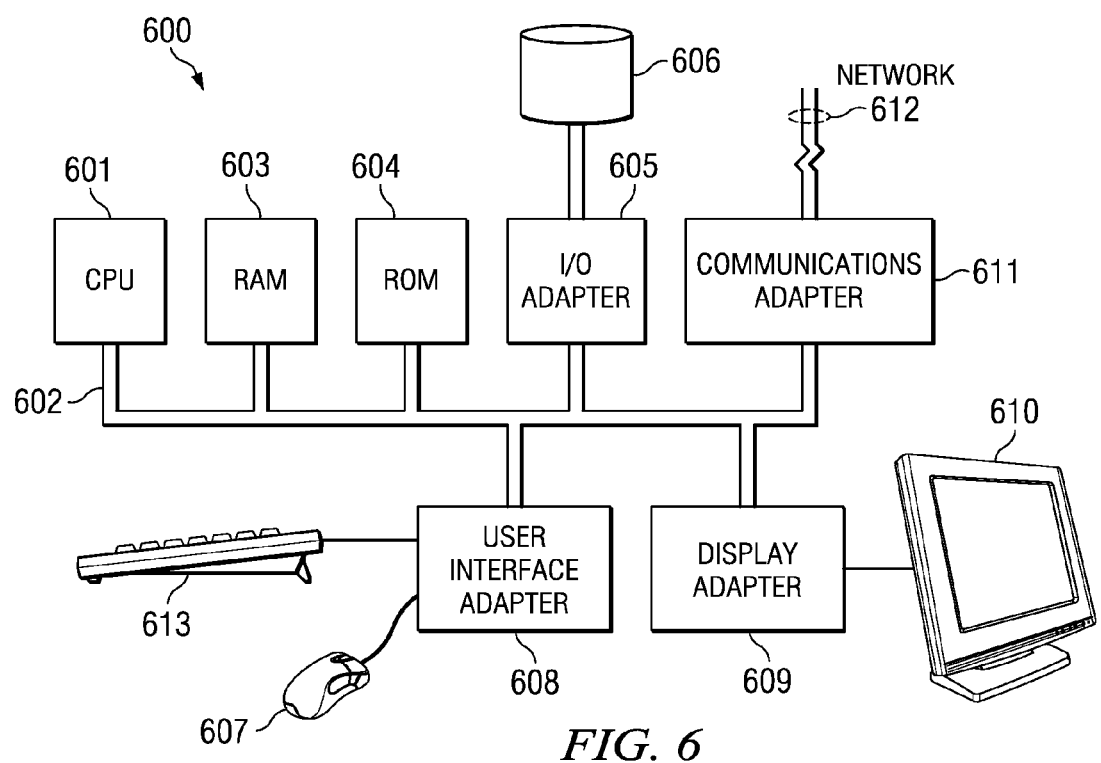
FIG. 6 illustrates a computer system adapted to use embodiments of the present invention.
Figure 7A:
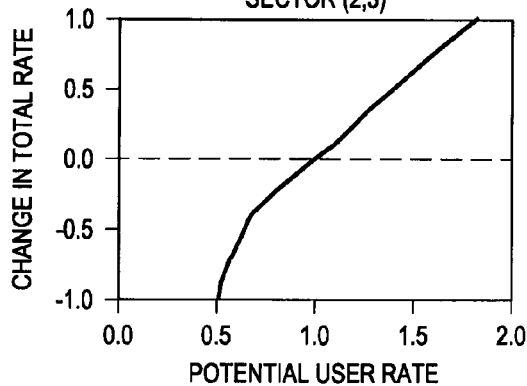
FIGS. 7(a)-7(d) illustrate plots, for each of the four central cells, of the function $\Delta_i$ versus $r_i$.
Figure 7B:
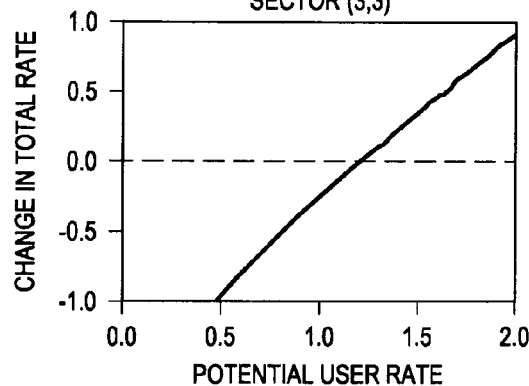
Figure 7C:
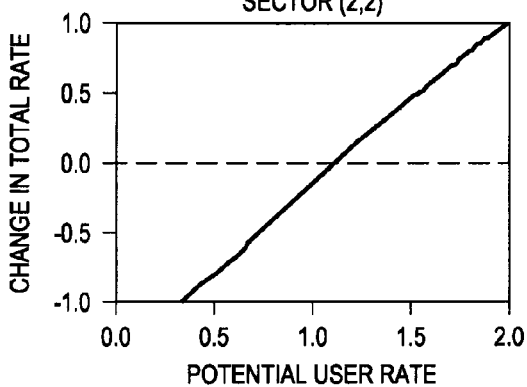
Figure 7D:
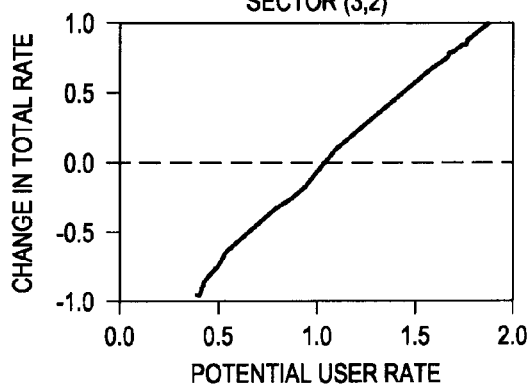

FIG. 6 illustrates computer system 600 adapted to use embodiments of the present invention, e.g. storing and/or executing software associated with the embodiments. Central processing unit (CPU) 1001 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the disclosed components and hardware may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing radio resources in an orthogonal frequency division multiple access (OFDMA) network, said method comprising:
   periodically determining, by a base station, an optimal power allocation for an access terminal within each sector of a plurality of sectors, said periodically determining comprising:
      calculating a sector transmission rate corresponding to said each sector, the calculating comprising:
         detecting a power, $p_i$, of a transmission from said access terminal;
         computing a channel gain, $g_{ii}$, within said each sector;
         detecting a total interference, $X_i$, experienced by said each sector;
         detecting a background noise, $N_i$, experienced by said each sector; and
         calculating said sector transmission rate, $r_i$, using a formula:

$$r_i = \log\left(1 + \frac{x_i}{X_i + N_i}\right);$$

and
   comparing said calculated sector transmission rate to a threshold transmission rate; and
   changing, by the base station, said optimal power allocation for said access terminal to maximum power when said calculated sector transmission rate is greater than said threshold transmission rate; wherein said periodically determining has an independent start time for each sector and a same period for each sector.

2. The method of claim 1 wherein said threshold transmission rate is predetermined by the base station in said each sector.

3. The method of claim 1 further comprising:
   routinely re-calculating said threshold transmission value based, at least in part, on a set of test threshold values, a random sequence of cells, and a set of random sector layouts.

4. The method of claim 1 further comprising:
   scheduling said access terminal for reverse link transmission;
   assigning said access terminal to a tile of said each sector when said power allocation of said access terminal is set to maximum power; and
   withholding said access terminal from assignment to said tile when said power allocation of said access terminal is set to zero power.

5. The method of claim 1 further comprising changing, by the base station, said optimal power allocation for said access terminal to
   zero power when said calculated sector transmission rate is less than or equal to said threshold transmission rate.

6. A method for managing radio resources in a sector of an orthogonal frequency division multiple access (OFDMA) network, said method comprising:
   calculating, by a base station, a reverse link transmission rate for an access terminal in said sector, the calculating comprising:
      detecting a power, $p_i$, of a transmission from said access terminal;
      computing a channel gain, $g_{ii}$, within said sector;
      detecting a total interference, $X_i$, experienced by said sector;
      detecting a background noise, $N_i$, experienced by said sector; and
      calculating said reverse link transmission rate, $r_i$, using the a formula:

$$r_i = \log\left(1 + \frac{x_i}{X_i + N_i}\right);$$

comparing, by the base station, said calculated reverse link transmission rate to a threshold transmission rate, wherein said threshold transmission rate is predetermined; and
   setting, by the base station, an optimal power allocation for said access terminal to maximum power when said calculated reverse link transmission rate is greater than said threshold transmission rate.

7. The method of claim 6 further comprising:
scheduling said access terminal for reverse link transmission;
assigning said access terminal to a tile of said sector when said power allocation of said access terminal is set to maximum power; and
withholding said access terminal from assignment to said tile when said power allocation of said access terminal is set to zero power.

8. The method of claim 6, further comprising changing, by the base station, said optimal power allocation for said access terminal to zero power when said calculated reverse link transmission rate is less than or equal to said threshold transmission rate.

9. The method of claim 6 wherein said threshold transmission rate is predetermined by the base station.

10. A base station for an orthogonal frequency division multiple access (OFDMA) network, said base station comprising:
a processor;
memory, accessible by said processor;
a power control module stored in said memory and executable by said processor, said power control module comprising:
a transmission rate calculator configured to calculate a reverse link transmission rate for an access terminal in a sector served by said base station, the transmission rate calculator further configured to:
receive a power, $p_i$, of a transmission detected by said base station from said access terminal;
receive a channel gain, $g_{ii}$, computed by said base station within said sector;
receive a total interference, $X_i$, detected by said base station in said sector as detected by said base station;
receiving a background noise, $N_i$, detected by said base station in said sector; and
calculate said reverse link transmission rate, $r_i$, using a formula:

$$r_i = \log\left(1 + \frac{x_i}{X_i + N_i}\right);$$

a rate comparator configured to compare said calculated reverse link transmission rate to a threshold transmission rate, wherein said threshold transmission rate is predetermined for said OFDMA network; and
a power allocation component configured to allocate power to said access terminal in accordance with results of said rate comparator.

11. The base station of claim 10 further comprising:
a scheduler configured to schedule said access terminal for reverse link transmission; and
a radio resource manager configured to assign said access terminal to a tile of said sector when said power allocation of said access terminal is set to maximum power and withhold said access terminal from assignment to said tile when said power allocation of said access terminal is set to zero power.

12. The base station of claim 10 wherein said power allocation component is configured to allocate to said access terminal:
maximum power; or
zero power.

13. The base station of claim 10, wherein said power allocation component is configured to allocate to said access terminal:
maximum power when said calculated reverse link transmission rate is greater than said threshold transmission rate.

14. The base station of claim 13, wherein said power allocation component is configured to allocate to said access terminal:
zero power when said calculated reverse link transmission rate is less than or equal to said threshold transmission rate.

15. The base station of claim 10 wherein said threshold transmission rate is predetermined by the base station.

16. A computer program product having a non-transitory computer readable medium with computer program logic recorded thereon, said computer program product comprising:
code for calculating a reverse link transmission rate for an access terminal in a sector of an orthogonal frequency division multiple access (OFDMA) network, the code for calculating further comprising:
code for detecting a power, $p_i$, of a transmission from said access terminal;
code for computing a channel gain, $g_{ii}$, within said sector;
code for detecting a total interference, $X_i$, experienced by said sector;
code for detecting a background noise, $N_i$, experienced by said sector; and
code for calculating said reverse link transmission rate, $r_i$, using a formula:

$$r_i = \log\left(1 + \frac{x_i}{X_i + N_i}\right);$$

code for comparing said calculated reverse link transmission rate to a threshold transmission rate, wherein said threshold transmission rate is predetermined; and
code for setting an optimal power allocation for said access terminal to maximum power when said calculated reverse link transmission rate is greater than said threshold transmission rate.

17. The computer program product of claim 16 further comprising:
code for scheduling said access terminal for reverse link transmission;
code for assigning said access terminal to a tile of said sector when said power allocation of said access terminal is set to maximum power; and
code for withholding said access terminal from assignment to said tile when said power allocation of said access terminal is set to zero power.

18. The computer program product of claim 16, further comprising code for setting said optimal power allocation for said access terminal to zero power when said calculated reverse link transmission rate is less than or equal to said threshold transmission rate.

19. The computer program product of claim 16, further comprising code for predetermining said threshold transmission rate.

* * * * *